US012710167B2

(12) United States Patent
Xiao et al.

(10) Patent No.: US 12,710,167 B2
(45) Date of Patent: Aug. 18, 2026

(54) CCT SWITCHABLE LAMP

(71) Applicant: SAVANT TECHNOLOGIES LLC, East Cleveland, OH (US)

(72) Inventors: Kun Xiao, Shanghai (CN); Jie Gao, Shanghai (CN); Hai Huang, Shanghai (CN); Chunxiao Gao, Shanghai (CN)

(73) Assignee: SAVANT TECHNOLOGIES LLC, East Cleveland, OH (US)

( * ) Notice: Subject to any disclaimer, the term of this patent is extended or adjusted under 35 U.S.C. 154(b) by 36 days.

(21) Appl. No.: 18/818,414

(22) Filed: Aug. 28, 2024

(65) Prior Publication Data

US 2025/0093020 A1 Mar. 20, 2025

(30) Foreign Application Priority Data

Sep. 13, 2023 (CN) ........................ 202311183346.5

(51) Int. Cl.

*F21V 23/04* (2006.01)
*F21V 23/00* (2015.01)
*F21V 23/06* (2006.01)

(52) U.S. Cl.

CPC ............ *F21V 23/04* (2013.01); *F21V 23/001* (2013.01); *F21V 23/004* (2013.01); *F21V 23/06* (2013.01)

(58) Field of Classification Search

CPC . F21K 9/23; F21K 9/232; F21K 9/233; F21K 9/235; F21K 9/237; F21K 9/238; F21S 10/02; F21S 10/023; F21S 10/026
See application file for complete search history.

(56) References Cited

U.S. PATENT DOCUMENTS 1,551,463 A * 8/1925 Brown ..................... H01K 9/04 439/615
5,422,798 A * 6/1995 Osiecki ............... F21V 23/0414 362/206
5,638,150 A * 6/1997 Doherty ................. A61B 3/125 351/218
11,466,818 B2 10/2022 Yan et al.
11,473,735 B2 10/2022 Chen et al.
(Continued)

FOREIGN PATENT DOCUMENTS

CN 112393129 A 2/2021
CN 213420708 U 6/2021
(Continued)

*Primary Examiner* — Zheng Song
*Assistant Examiner* — James M Endo
(74) *Attorney, Agent, or Firm* — Wood IP LLC

(57) ABSTRACT

Provided is a CCT switchable lamp that includes a light-emitting assembly, having a bulb and conductive wires at the bottom of the bulb, a drive unit having a PCB and a CCT switching switch on the PCB, a base component at the bottom of the light-emitting assembly accommodating the drive unit, and a central connection pin at an axial end of the base component away from the bulb and being electrically connected to the drive unit by a connection conductive wire, the CCT switching switch is located on a central axis of the lamp and is rotatable around the central axis to switch the CCT, and the lamp also includes a rotatable annular member connected to the CCT switching switch, the center of the annular member is located on the central axis, and the annular member is rotatable around the central axis to drive rotation of the CCT switching switch.

16 Claims, 4 Drawing Sheets

(56) References Cited

U.S. PATENT DOCUMENTS

| | | | | |
|---|---|---|---|---|
| 2010/0033948 | A1* | 2/2010 | Harbers | F21V 3/08 362/235 |
| 2012/0032589 | A1* | 2/2012 | Lai | F21V 23/003 315/35 |
| 2012/0236535 | A1* | 9/2012 | Parker | F21V 13/08 362/293 |
| 2012/0236595 | A1* | 9/2012 | Parker | F21V 9/40 362/609 |
| 2014/0049963 | A1* | 2/2014 | McGuire | F21K 9/232 362/382 |
| 2016/0018087 | A1* | 1/2016 | Gielen | F21V 23/06 29/876 |
| 2018/0092183 | A1* | 3/2018 | Halliwell | F21V 29/70 |
| 2021/0018147 | A1* | 1/2021 | Liu | F21K 9/237 |
| 2021/0054974 | A1* | 2/2021 | Li | F21V 23/006 |
| 2021/0095840 | A1* | 4/2021 | Zhou | F21V 23/004 |
| 2021/0404618 | A1* | 12/2021 | Li | H01H 36/00 |
| 2021/0404642 | A1* | 12/2021 | Li | F21K 9/237 |
| 2022/0120387 | A1* | 4/2022 | Yan | H05B 45/10 |

FOREIGN PATENT DOCUMENTS

| | | | |
|---|---|---|---|
| CN | 218153701 | U | 12/2022 |
| CN | 115789599 | A | 3/2023 |

* cited by examiner

CCT SWITCHABLE LAMP

CROSS-REFERENCE TO RELATED APPLICATION

This application claims priority to Chinese Patent Application Serial Number 202311183346.5, filed Sep. 13, 2023, which is herein incorporated by reference.

DESCRIPTION

Technical Field

The present invention relates to a field of lamps, and more particularly to a correlated color temperature (CCT) switchable lamp.

Background

A lamp typically comprises a built-in drive unit, and thus the lamp can be mounted on a conventional lamp socket. The lamp provides the possibility of achieving a variety of different lighting characteristics or effects by means of the built-in drive unit. One noteworthy lighting characteristic is CCT, e.g., cool white, warm white, etc.

In order to be able to adjust the settings of the drive unit, a user usually needs to communicate with the drive unit of the lamp. However, it is desirable that the user can manually adjust the settings of the drive unit regarding individual lamps without using a network.

Conventional switching mechanisms are generally not aesthetic enough, can only realize a small number of CCT switching stages, and are inconvenient for the user to operate.

SUMMARY

In view of the above, in order to eliminate or alleviate the above problem, the present invention discloses a CCT switchable lamp, the lamp comprising: a light-emitting assembly, comprising a bulb and conductive wires provided at the bottom of the bulb; a drive unit, comprising a PCB (printed circuit board) and a CCT switching switch provided on the PCB; a base component, being provided at the bottom of the light-emitting assembly and accommodating the drive unit; and a central connection pin, wherein the central connection pin is provided at an axial end of the base component away from the bulb, and the central connection pin is electrically connected to the drive unit by a connection conductive wire extending from the drive unit, wherein the CCT switching switch is located on a central axis of the lamp and is configured to be rotatable around the central axis to switch the CCT, and the lamp further comprises a rotatable annular member, the annular member is connected to the CCT switching switch by means of a connector, the center of the annular member is located on the central axis, and the annular member is configured to be rotatable around the central axis so as to drive rotation of the CCT switching switch.

Further, the annular member is provided at the axial end of the base component away from the bulb and encloses the central connection pin.

Further, the annular member comprises an annular member body having a hollow truncated cone shape.

Further, the annular member comprises two gripping portions opposite to each other in a circumferential direction, each gripping portion of the two gripping portions is formed by being indented radially inwards from an outer circumferential surface of the annular member body, and each gripping portion indented radially inwards comprises a flat plate perpendicular to the central axis and a flat surface perpendicular to the flat plate.

Further, the annular member further comprises two clamping claws protruding from the bottom of the annular member body towards the PCB in a direction parallel to the central axis.

Further, the connector comprises an axially-extending section extending parallel to the central axis, a first axial end of the axially-extending section is connected to the CCT switching switch, and a second axial end of the axially-extending section opposite to the first axial end is connected to the annular member.

Further, the lamp further comprises an insulation sleeve, the insulation sleeve is provided inside the base component, and the drive unit and the connector are provided inside the insulation sleeve.

Further, the annular member is configured to be rotatable in a range of 0 to 270 degrees around the central axis.

Further, the annular member is configured to be rotatable in a clockwise direction and/or in a counterclockwise direction around the central axis.

Further, the annular member is provided between the bottom of the bulb and an axial end of the base component close to the bulb.

Further, the connector comprises a connecting rod extending in a radial direction perpendicular to the central axis, wherein the connecting rod comprises a first radial end and a second radial end opposite to the first radial end, the first radial end is connected to a peripheral surface of the annular member, and the second radial end is connected to the CCT switching switch.

Further, the lamp further comprises an insulation housing, the insulation housing is connected between the bottom of the bulb and the base component, and the annular member is provided on the insulation housing.

Further, the insulation housing comprises a boss-shaped base portion and a hollow cylindrical portion which are connected to each other in the direction of the central axis, the CCT switching switch is located inside the insulation housing, and the base component is fixed to the insulation housing and accommodates the cylindrical portion, the boss-shaped base portion has an annular mounting face perpendicular to the central axis, the annular member is provided on the annular mounting face, and the cylindrical portion comprises a through groove provided in an annular side wall of the cylindrical portion for the connecting rod to pass through, such that the through groove defines a rotation range of the annular member in a circumferential direction.

Further, a circumferential range of the through groove is defined to be less than three fourths of the perimeter of the cylindrical portion.

Further, the annular member is configured to be rotatable in a clockwise direction and in a counterclockwise direction around the central axis.

Further, a plurality of CCT marks spaced apart from each other in the circumferential direction are provided on an outer circumferential surface of the boss-shaped base portion, and an indication mark is provided on an outer circumferential surface of the annular member for indicating current CCT of the lamp.

Further, the annular member comprises a plurality of ribs provided on an outer circumferential surface thereof, the ribs being provided at equal intervals from each other in a circumferential direction.

The lamp of the present invention has an aesthetic appearance, can achieve multi-stage switching of CCT and is convenient for a user to operate.

BRIEF DESCRIPTION OF THE DRAWINGS

Hereinafter, preferred embodiments of the present invention will be described in detail with reference to the accompanying drawings, such that a person of ordinary skill in the art could understand the described and other features and advantages of the present invention more clearly, in which.

DETAILED DESCRIPTION OF THE EMBODIMENTS

Figure 1:
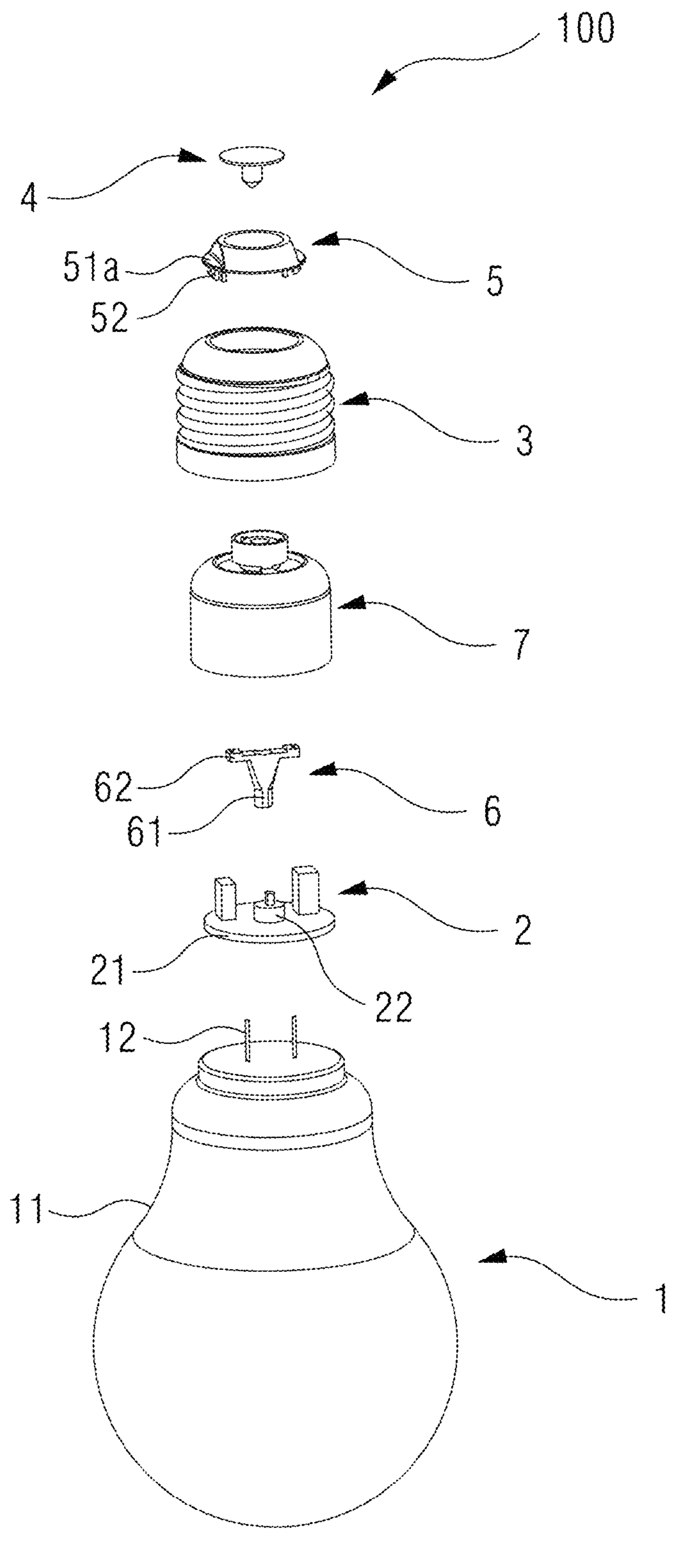
FIG. 1 is an exploded view showing a lamp according to a first embodiment of the present invention.

To make the objectives, technical solutions, and advantages of the present invention clearer, hereinafter, the present invention is further described in detail by taking embodiments as examples.

Hereinafter, a lamp 100 of a first embodiment of the present invention will be described with reference to FIGS. 1 and 2, and a lamp 100' of a second embodiment of the present invention will be described with reference to FIGS. 3 and 4.

In general, the present invention discloses a CCT switchable lamp 100, 100'. The lamp 100, 100' may comprise a light-emitting assembly 1, a drive unit 2, a base component 3 and a central connection pin 4.

The light-emitting assembly 1 may comprise a bulb 11 and conductive wires 12 provided at the bottom of the bulb 11. The drive unit 2 may comprise a PCB 21 and a CCT switching switch 22 provided on the PCB 21. The base component 3 may be provided at the bottom of the light-emitting assembly 1 and accommodate the drive unit 2. The central connection pin 4 may be provided at an axial end of the base component 3 away from the bulb 11, and the central connection pin 4 may be electrically connected to the drive unit 2, for example, by a connection conductive wire extending from the drive unit 2.

The CCT switching switch 22 may be located on a central axis X of the lamp 100, 100', and configured to be rotatable around the central axis X to switch the CCT. The lamp 100, 100' can further comprise a rotatable annular member 5, and the annular member 5 is connected to the CCT switching switch 22 by a connector 6. The center of the annular member 5 is located on the central axis X, and the annular member 5 is configured to be rotatable around the central axis X so as to drive rotation of the CCT switching switch 22.

Figure 2:
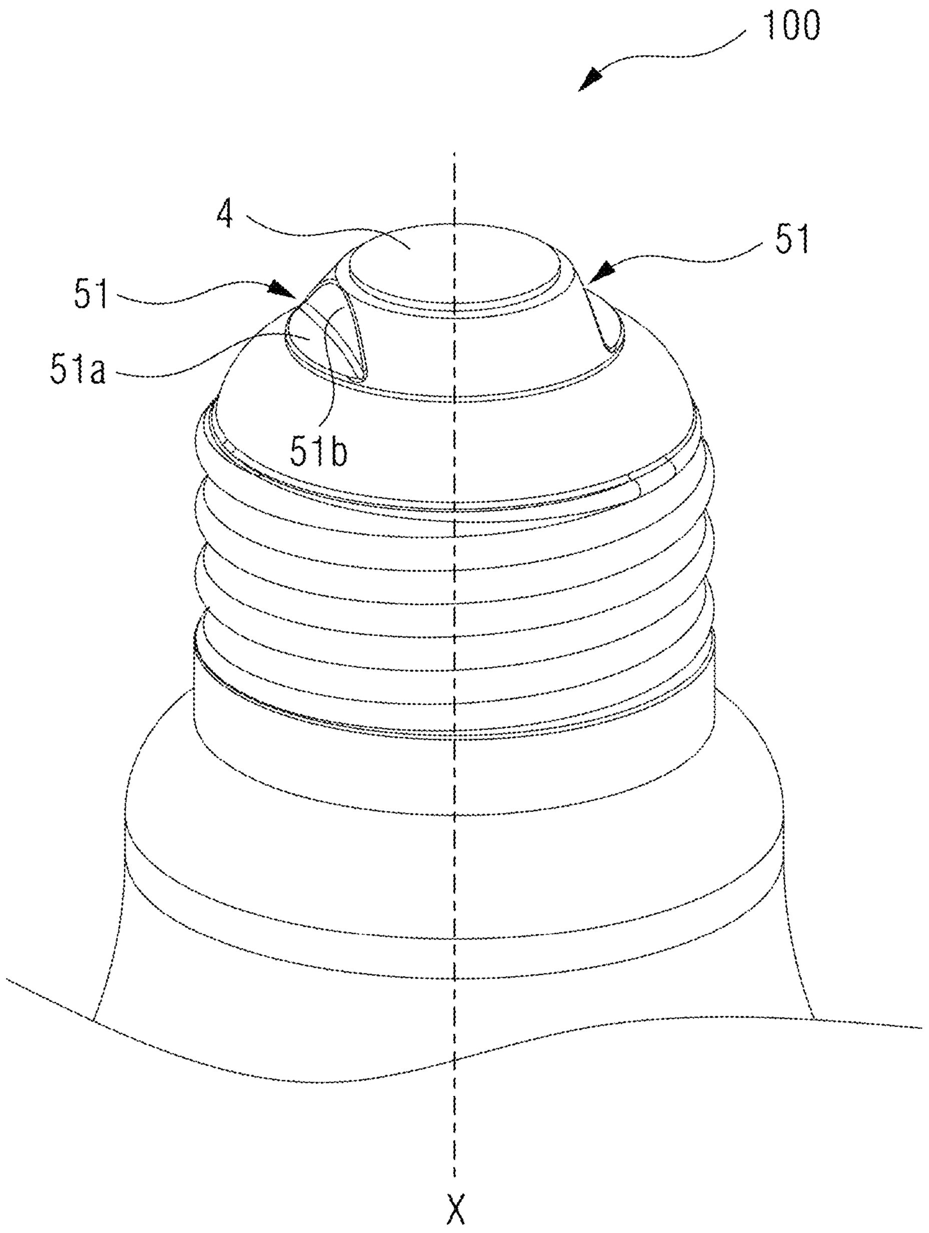
FIG. 2 is a schematic perspective view showing a part of the lamp according to the first embodiment of the present invention.

With reference to the first embodiment of the present invention as shown in FIGS. 1 and 2, the annular member 5 can be provided at the axial end of the base component 3 away from the bulb 11 and enclose the central connection pin 4; in other words, the annular member 5 is sleeved outside the central connection pin 4 and can rotate around the central axis X, while the central connection pin 4 is stationary.

In this embodiment, the annular member 5 may comprise an annular member body having a hollow truncated cone shape. The annular member 5 may further comprise two gripping portions 51 opposite to each other in a circumferential direction. Each gripping portion 51 of the two gripping portions 51 may be formed by being indented radially inwards from an outer circumferential surface of the annular member body. Each gripping portion 51 indented radially inwards comprises a flat plate 51*a* perpendicular to the central axis X and a flat surface 51*b* perpendicular to the flat plate 51*a*, wherein in use, the flat surface 51*b* may facilitate gripping by a user to rotate the annular member 5.

The annular member 5 may also comprise two clamping claws 52 protruding from the bottom of the annular member body towards the PCB 21 in a direction parallel to the central axis X. In particular, the two clamping claws 52 may protrude from the flat plates 51*a* of the gripping portions towards the PCB 21, that is, one clamping claw 52 protrudes from the flat plate 51*a* of each gripping portion. Thus, in this embodiment, two clamping claws 52 are provided, and the two clamping claws 52 are spaced apart from each other.

The connector 6 may comprise an axially-extending section 61 extending parallel to the central axis X. A first axial end of the axially-extending section 61 is connected to the CCT switching switch 22. A second axial end of the axially-extending section 61 opposite to the first axial end is connected to the annular member 5. In particular, the connector 6 may also comprise a transversely-extending section 62 transverse to the axially-extending section 61, and the second axial end of the axially-extending section 61 opposite to the first axial end is connected to the transversely-extending section 62, for example connected to an intermediate portion of the transversely-extending section 62, and the transversely-extending section 62 may be connected between the two clamping claws 52, for example clamped by the two clamping claws 52. Of course, the specific shape of the connector 6 in this embodiment is not limited thereto, as long as the connector can connect the annular member 5 and the CCT switching switch 22 together and can enable the rotation of the annular member 5 to drive the rotation of the CCT switching switch 22.

The lamp 100 can further comprise an insulation sleeve 7, the insulation sleeve 7 is provided inside the base component 3, and the drive unit 2 and the connector 6 are provided inside the insulation sleeve 7. The insulation sleeve 7 may be made of plastic.

According to the above arrangement of the first embodiment of the present invention, the annular member 5 may be configured to be rotatable in a range of 0 to 270 degrees around the central axis X. Moreover, the annular member 5 may be configured to be rotatable in a clockwise and/or counterclockwise direction around the central axis X.

Accordingly, by providing the annular member 5 at the axial end of the base component 3 away from the bulb 11, the lamp 100 according to the first embodiment of the present invention has an aesthetic appearance, and the user can conveniently switch the CCT by rotating the annular member 5. Furthermore, since the annular member 5 can rotate within a large rotation range, the lamp 100 can be provided with a plurality of CCT switching stages, or perform stepless switching (i.e., continuous switching within a specific CCT range).

Figure 3:
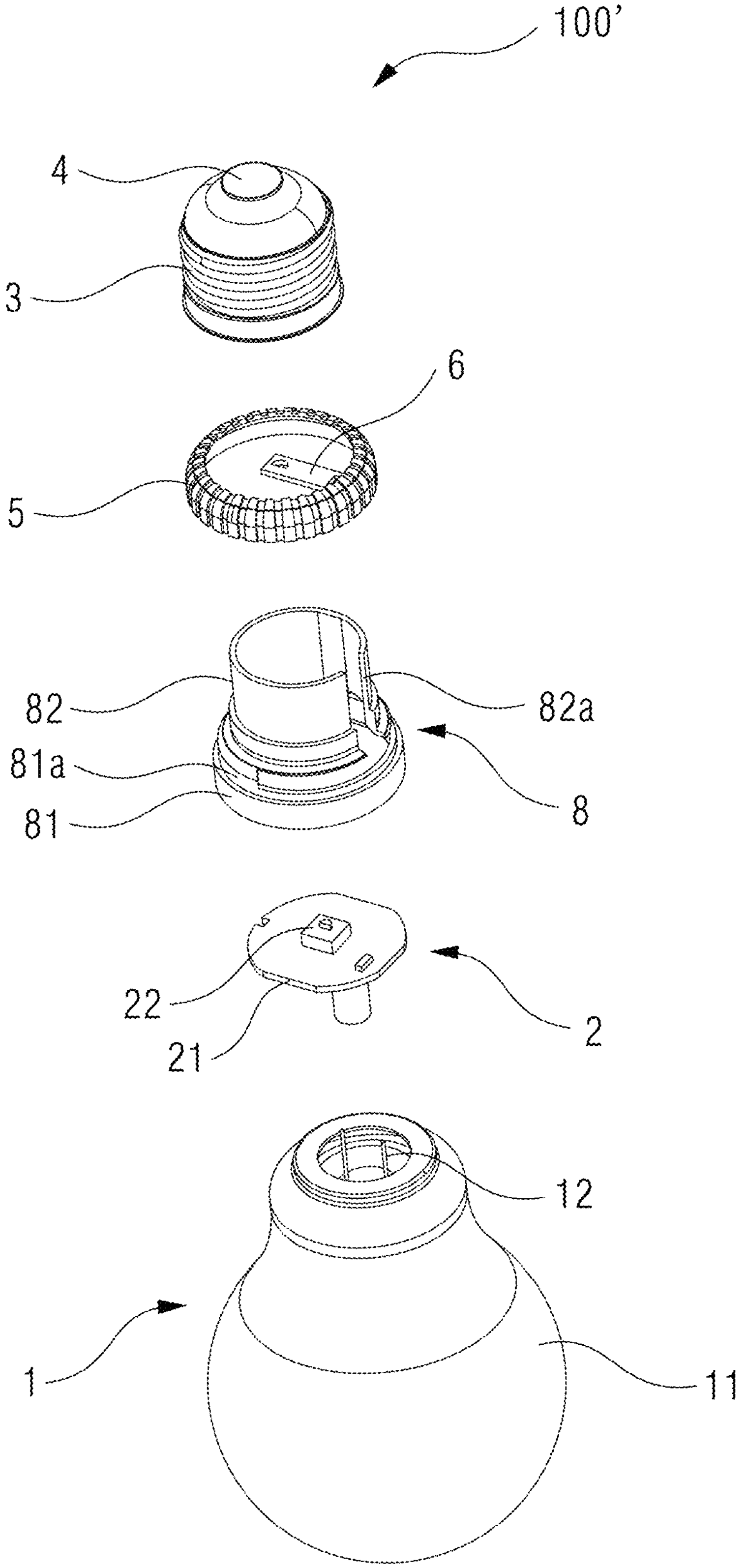
FIG. 3 is an exploded view showing a lamp according to a second embodiment of the present invention.
Figure 4:
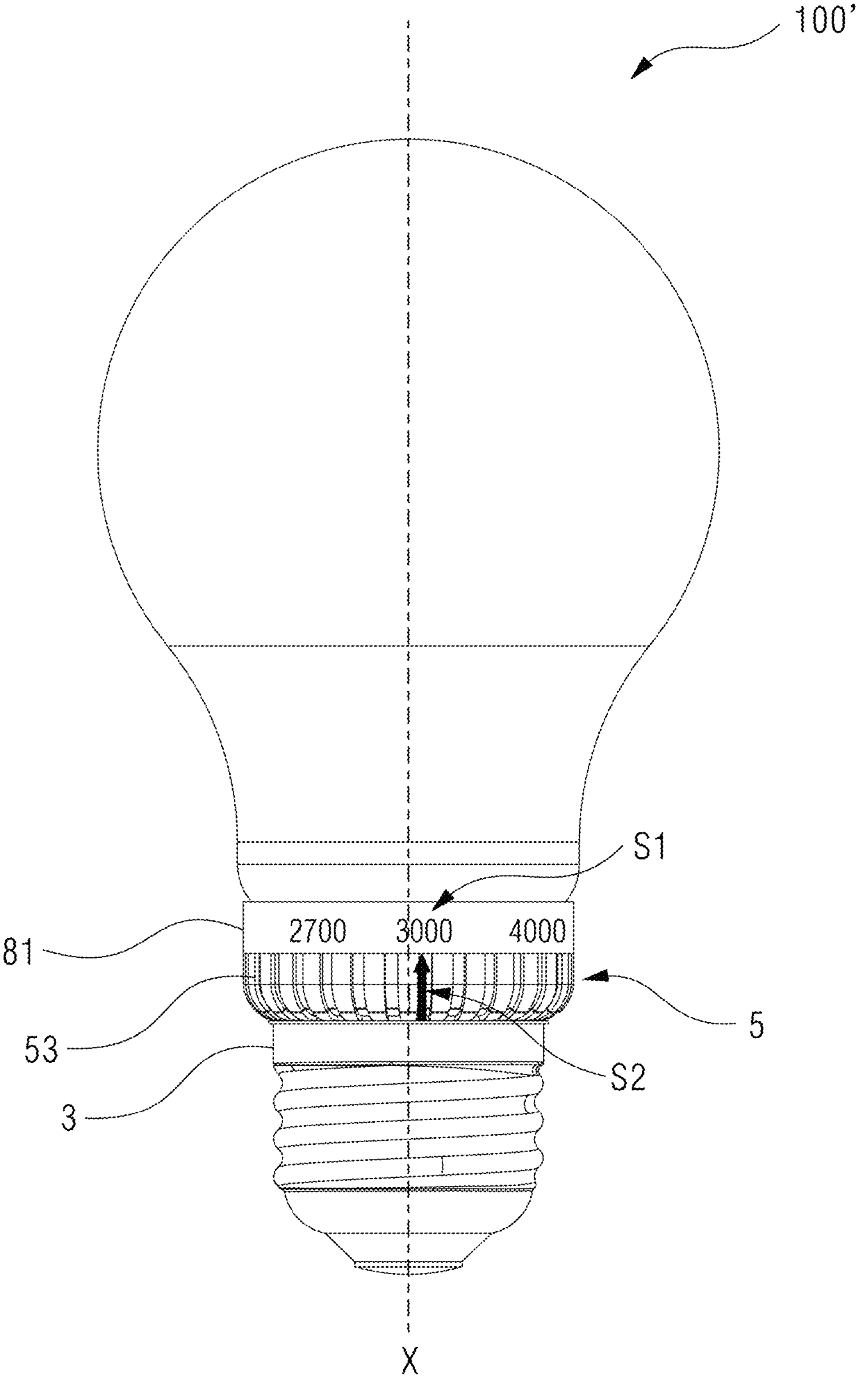
FIG. 4 is a schematic side view showing the lamp according to the second embodiment of the present invention.

With reference to the second embodiment of the present invention as shown in FIGS. 3 and 4, the annular member 5 may be provided between the bottom of the bulb 11 and the axial end of the base component 3 close to the bulb 11.

In this embodiment, the connector 6 may comprise a connecting rod extending in a radial direction perpendicular to the central axis X, wherein the connecting rod comprises a first radial end and a second radial end opposite to the first radial end. The first radial end is connected to the circumferential surface of the annular member 5, and the second radial end is connected to the CCT switching switch 22. Thus, the rotation of the annular member 5 can drive the rotation of the CCT switching switch 22.

The lamp 100' can further comprise an insulation housing 8, the insulation housing 8 is connected between the bottom of the bulb 11 and the base component 3, and the annular member 5 can be provided on the insulation housing 8. The insulation housing 8 may be made of plastic.

The insulation housing 8 may comprise a boss-shaped base portion 81 and a hollow cylindrical portion 82 which are connected to each other in the direction of the central axis X. The CCT switching switch 22 is located inside the insulation housing 8, and the base component 3 is fixed to the insulation housing 8 and accommodates the cylindrical portion 82. The boss-shaped base portion 81 has an annular mounting face 81*a* perpendicular to the central axis X, and the annular member 5 can be provided on the annular mounting face 81*a*. The diameter of the boss-shaped base portion 81 may be greater than the diameter of the cylindrical portion 82. The cylindrical portion 82 comprises a through groove 82*a* provided in an annular side wall of the cylindrical portion 82 for the connecting rod to pass through, such that the through groove 82*a* defines a rotation range of the annular member 5 in a circumferential direction. In other words, the rotation of the annular member 5 is limited by the circumferential range of the through groove 82*a*, and the annular member 5 is stopped by one of two opposite side edges of the through groove 82*a* when it rotates to a limit position.

Preferably, a circumferential range of the through groove 82*a* may be defined to be less than three fourths of the perimeter of the cylindrical portion 82. For example, when the circumferential range of the through groove 82*a* is defined as three fourths of the perimeter of the cylindrical portion 82, the annular member 5 can rotate within a rotation range having 270 degrees. Also, the rotation range of the annular member 5 can be set as needed depending on the size of the circumferential range of the through groove 82*a*.

Accordingly, the annular member 5 may be configured to be rotatable in a clockwise direction and a counterclockwise direction around the central axis X, so as to be rotatable within the above rotation range.

A plurality of CCT marks S1 (e.g., symbols indicating corresponding CCTs) spaced apart from each other in the circumferential direction may be provided on an outer circumferential surface of the boss-shaped base portion 81, and an indication mark S2 (e.g., an arrow mark) may be provided on an outer circumferential surface of the annular member 5 for indicating current CCT of the lamp 100'. The CCTs corresponding to the plurality of CCT marks S1 comprise, for example, 1800 K, 2700 K, 3000 K, 3500 K, 4000 K, 5000 K, 6500 K, 12000 K, and the like.

The annular member 5 may comprise a plurality of ribs 53 provided on the outer circumferential surface thereof, and the plurality of ribs 53 may be provided at equal intervals in the circumferential direction, thereby increasing the frictional force between the hand of the user and the outer circumferential surface of the annular member 5, so as to facilitate the rotation of the annular member 5 by the user.

Accordingly, by providing the annular member 5 between the bottom of the bulb 11 and the axial end of the base component 3 close to the bulb 11, the lamp 100' according to the second embodiment of the present invention has an aesthetic appearance, and the user can conveniently switch the CCT by rotating the annular member 5. Furthermore, since the annular member 5 can rotate within a large rotation range, e.g., rotating in 270 degrees, the lamp 100' can be provided with a plurality of CCT switching stages, or perform stepless switching (i.e., continuous switching within a specific CCT range).

The above content merely relates to preferred embodiments of the present invention and is not intended to limit the present invention. Any modifications, equivalent replacements, improvements, etc. made within the spirit and principle of the present invention shall all fall within the scope of protection of the present invention.

The invention claimed is:

1. A correlated color temperature (CCT) switchable lamp, the lamp comprising:

a light-emitting assembly comprising a bulb and conductive wires provided at the bottom of the bulb;

a drive unit comprising a PCB and a CCT switching switch provided on the PCB;

a base component being provided at the bottom of the light-emitting assembly and accommodating the drive unit; and a central connection pin, wherein the central connection pin is provided at an axial end of the base component away from the bulb, and the central connection pin is electrically connected to the drive unit by a connection conductive wire extending from the drive unit, wherein the CCT switching switch is located on a central axis of the CCT switchable lamp and is configured to be rotatable around the central axis to switch the CCT, and the CCT switchable lamp further comprises a rotatable annular member, the annular member is connected to the CCT switching switch by means of a connector, the center of the annular member is located on the central axis, and the annular member (i) has an outer surface that is configured to be directly rotated by an end user and (ii) is configured to be rotatable around the central axis in a clockwise direction and in a counterclockwise direction so as to drive rotation of the CCT switching switch.

2. The CCT switchable lamp according to claim 1, wherein the annular member is provided at the axial end of the base component away from the bulb and encloses the central connection pin.

3. The CCT switchable lamp according to claim 2, wherein the annular member comprises an annular member body having a hollow truncated cone shape.

4. The CCT switchable lamp according to claim 3, wherein the annular member comprises two gripping portions opposite to each other in a circumferential direction, each gripping portion of the two gripping portions is formed by being indented radially inwards from an outer circumferential surface of the annular member body, and each gripping portion indented radially inwards comprises a flat plate perpendicular to the central axis and a flat surface perpendicular to the flat plate.

5. The CCT switchable lamp according to claim 3, wherein the annular member further comprises two clamping claws protruding from the bottom of the annular member body towards the PCB in a direction parallel to the central axis.

6. The CCT switchable lamp according to claim 2, wherein the connector comprises an axially-extending section extending parallel to the central axis, a first axial end of the axially-extending section is connected to the CCT switching switch, and a second axial end of the axially-extending section opposite to the first axial end is connected to the annular member.

7. The CCT switchable lamp according to claim 2, further comprises an insulation sleeve, the insulation sleeve is provided inside the base component, and the drive unit and the connector are provided inside the insulation sleeve.

8. The CCT switchable lamp according to claim 2, wherein the annular member is configured to be rotatable in a range of 0 to 270 degrees around the central axis.

9. The CCT switchable lamp according to claim 2, wherein the annular member is configured to be rotatable in a clockwise direction and/or in a counterclockwise direction around the central axis.

10. The CCT switchable lamp according to claim 1, wherein the annular member is provided between the bottom of the bulb and an axial end of the base component close to the bulb.

11. The CCT switchable lamp according to claim 10, wherein the connector comprises a connecting rod extending in a radial direction perpendicular to the central axis, wherein the connecting rod comprises a first radial end and a second radial end opposite to the first radial end, the first radial end is connected to a peripheral surface of the annular member, and the second radial end is connected to the CCT switching switch.

12. The CCT switchable lamp according to claim 11, wherein the lamp further comprises an insulation housing, the insulation housing is connected between the bottom of the bulb and the base component, and the annular member is provided on the insulation housing.

13. The CCT switchable lamp according to claim 12, wherein the insulation housing comprises a boss-shaped base portion and a hollow cylindrical portion which are connected to each other in the direction of the central axis, the CCT switching switch is located inside the insulation housing, and the base component is fixed to the insulation housing and accommodates the cylindrical portion, the boss-shaped base portion has an annular mounting face perpendicular to the central axis, the annular member is provided on the annular mounting face, and the cylindrical portion comprises a through groove provided in an annular side wall of the cylindrical portion for the connecting rod to pass through, such that the through groove defines a rotation range of the annular member in a circumferential direction.

14. The CCT switchable lamp according to claim 13, wherein a circumferential range of the through groove is defined to be less than three fourths of the perimeter of the cylindrical portion.

15. The CCT switchable lamp according to claim 13, wherein a plurality of CCT marks spaced apart from each other in the circumferential direction are provided on an outer circumferential surface of the boss-shaped base portion, and an indication mark is provided on an outer circumferential surface of the annular member for indicating current CCT of the CCT switchable lamp.

16. The CCT switchable lamp according to claim 10, wherein the annular member comprises a plurality of ribs provided on an outer circumferential surface thereof, the ribs being provided at equal intervals from each other in a circumferential direction.

* * * * *